Patented Sept. 8, 1936

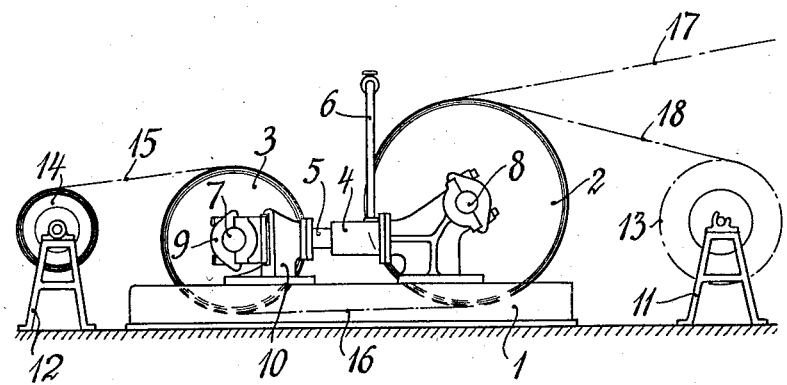

2,054,000

UNITED STATES PATENT OFFICE 2,054,000

METHOD FOR VULCANIZING BELTS, PLATES, AND THE LIKE OF VULCANIZABLE MATERIALS

Willy Neerbye, Oslo, Norway, assignor to A/S. Den Norske Remfabrik, Oslo, Norway Application December 13, 1934, Serial No. 757,373 In Germany December 28, 1933

6 Claims. (Cl. 18—53)

Object of the invention is a method for vulcanizing belts, plates and the like of vulcanizable materials with or without reinforcing fabric material. It is well known to wrap such belts on a drum for the purpose of vulcanizing and exert a pressure on the same by means of a steel ribbon wrapped on the drum together with the belt. In such method the drum with belt and steel ribbon is heated by means of steam and the like. Such known method requires large plants owing to the fact that the vulcanizing heat is transferred to the belt from the drum, that is to say the belt is only heated on one surface whereas the opposite surface is not exposed to a heating action.

According to the present invention such disadvantage is dispensed with by using the steel ribbon as an electrical resistance so as to obtain the vulcanizing temperature by electric current. In this way is obtained that the belt with its broad surfaces contacts with hot ribbon so as to secure an effective and even transfer of heat to the same. In such way may be obtained, as proved in practice, a capacity that is ten times as large as is the case in the known method.

It is also well known to vulcanize a cover on an electric leader by exposing the same to the pressure of rollers simultaneously with passing an electric current through the leader. However, such method has that disadvantage that the heat is only transferred to the inner surface of the cover whereas the outer surface is exposed to cold air. Consequently the method may only be used when the covers are thin. The known method further has that disadvantage that the leader which is a good electric leader, must be exposed to very strong current, if the desired result should be obtained. Oppositely to such known method a steel ribbon is used in the present method as electric leader and owing to its bad conducting qualities the heat caused by the current would be strong.

The good transfer of heat obtained, according to the present invention, also allows a vulcanizing action by comparatively low temperature and further the vulcanizing time may be reduced by preheating the steel ribbon.

As the pressure to which the belt and the like is exposed during the vulcanizing process is important to the result, it is suitable to arrange the wrapping machinery thus that the pressure may be controlled. A suitable method of obtaining the mentioned controlling consists in connecting hydraulically the stock roller of the steel ribbon with the vulcanizing roll, so that the pressure may be measured by measuring the hydraulic pressure.

A suitable device for performing the invention is illustrated as an example in the enclosed drawing.

In such drawing 1 designates the base of the machine which carries a drum 2 the shaft 8 of which is supported in fixed bearings and a drum 3 the shaft of which is supported by a bearing 9 on a slide 10 which is movable relatively to drum 2. 4 designates a hydraulic cylinder and 5 its piston. Two such cylinders may be arranged, one on each side, communicating with each other by means of a pipe 6 carrying a pressure measuring apparatus. The bearing 9 should be insulated electrically.

The shafts 7 and 8 are connected to a suitable source of electric current, not shown.

11 and 12 designate frames for two stockdrums 13 and 14. 15 designates an insulating ribbon, 16 a steel ribbon, 17 the belt which is to be vulcanized and 18 the vulcanized belt.

On the drum 3 is first wrapped the insulating ribbon 15 together with the steel ribbon 16 and the latter is then preferably by means of an electric current preheated toward vulcanizing temperature, the current passing from the source of current through the shaft 7, the drum 3, the steel ribbon 16, the drum 2 to which the latter is connected and the shaft 8 back to the said source. Then the steel ribbon 16 is wrapped on the drum 2 together with the belt which is to be vulcanized. The desired pressure is obtained by braking the shaft 7 and the pressure is controlled by measuring the hydraulic pressure in the pipe 6. During the vulcanizing operation also the surface of the drum may be maintained at the same temperature as the steel ribbon by means of special electric heating devices.

By controlling the strength of the current the temperature may be maintained at a desired height, the temperature being controlled preferably by means of electrical temperature measuring apparatus.

After the vulcanizing process is at an end, the ready product may be wrapped upon the drum 13 and the steel ribbon wrapped upon the stockdrum 3 together with the insulating ribbon 15 from the drum 14.

I claim:—

1. A method of the character described, comprising coiling a ribbon of vulcanizable material and a steel ribbon about an axis, maintaining the steel ribbon under controlled tension as it is coiled about said axis for uniformly compressing said vulcanizable material as the latter is coiled about said axis, and vulcanizing said vulcanizable material by heat produced by electric current while said material is coiled about said axis.

2. A method of the character described, comprising preheating a steel ribbon, coiling said preheated ribbon and a ribbon of vulcanizable material about an axis, maintaining the preheated steel ribbon under controlled tension as it is coiled about said axis for uniformly compressing said vulcanizable material as the latter is coiled about said axis, and vulcanizing said vulcanizable material by heat produced by electric current while said material is coiled about said axis.

3. A method of the character described, comprising simultaneously coiling a stock ribbon of vulcanizable material and a steel ribbon about an axis, maintaining the steel ribbon under controlled tension as it is coiled about said axis for uniformly compressing said stock ribbon as the latter is coiled about said axis, measuring the tension of the steel ribbon as it is coiled about said axis to determine the compressive force applied to said stock ribbon, and vulcanizing said stock ribbon while the latter is coiled about said axis.

4. A method of the character described, comprising preheating a steel ribbon, simultaneously coiling said preheated steel ribbon and a stock ribbon of vulcanizable material about an axis, maintaining the steel ribbon under controlled tension as it is coiled about said axis for uniformly compressing said stock ribbon as the latter is coiled about said axis, measuring the tension of the preheated steel ribbon as it is coiled about said axis to determine the compressive force applied to said stock ribbon, and vulcanizing said stock ribbon while the latter is coiled about said axis.

5. In a method of the character described, unwinding preheated insulated coils of a ribbon of electricity-conducting material from a drum, simultaneously winding the ribbon into convolutions about a second drum while separating said convolutions from one another by winding convolutions of a ribbon of vulcanizable material between the same, resisting the movement of said ribbon of electricity-conducting material toward the axis of the first drum during the winding of the convolutions on the second drum for uniformly compressing the vulcanizable material about said second drum, and vulcanizing said vulcanizable material as it is coiled about said second drum.

6. In a method of the character described, unwinding preheated insulated coils of a ribbon of electricity-conducting material from a drum, simultaneously winding the ribbon into convolutions about a second drum while separating said convolutions from one another by winding convolutions of a ribbon of vulcanizable material between the same, resisting the movement of said ribbon of electricity-conducting material toward the axis of the first drum during the winding of the convolutions on the second drum for uniformly compressing the vulcanizable material about said second drum, measuring the tension of said ribbon of electricity-conducting material as it passes from the first drum to the second drum to determine the compressive force applied to said vulcanizable material, and vulcanizing said vulcanizable material by heat produced by electric current while said material is coiled about said second drum.

WILLY NEERBYE.